United States Patent
Bavant et al.

(10) Patent No.: US 6,498,780 B1
(45) Date of Patent: Dec. 24, 2002

(54) METHOD FOR DETECTING UPSTREAM CONGESTION IN AN ATM COMMUTATOR WITH A SWITCHING SYSTEM ARCHITECTURE AND INPUT MEMORIZATION

(75) Inventors: Marc Bavant, Paris (FR); Michel Delattre, Boulogne (FR); David Mouen Makoua, Nanterre (FR); Colette Vivant, St Germain en Laye (FR)

(73) Assignee: Thomson-CSF, Paris (FR)

( * ) Notice: Subject to any disclaimer, the term of this patent is extended or adjusted under 35 U.S.C. 154(b) by 0 days.

(21) Appl. No.: 09/147,511

(22) PCT Filed: Jul. 11, 1997

(86) PCT No.: PCT/FR97/01287

§ 371 (c)(1),
(2), (4) Date: Jan. 12, 1999

(87) PCT Pub. No.: WO98/02997

PCT Pub. Date: Jan. 22, 1998

(30) Foreign Application Priority Data

Jul. 12, 1996 (FR) ............................................. 96 08734

(51) Int. Cl.[7] ............................................. G01R 31/08
(52) U.S. Cl. ................... 370/229; 370/230; 370/236.1; 370/395.1; 370/397; 370/409; 370/395.7
(58) Field of Search ................... 370/229, 230, 370/231, 232, 233, 234, 235, 235.1, 236.1, 252, 253, 395.1, 395.2, 395.21, 396, 397, 409, 412, 413, 414, 395.7, 395.71

(56) References Cited

U.S. PATENT DOCUMENTS 5,167,033 A * 11/1992 Bryant et al. ................ 370/235
5,754,530 A * 5/1998 Awdeh et al. ................ 370/234
5,812,527 A * 9/1998 Kline et al. ................. 370/232
6,144,978 A 11/2000 Bavant

FOREIGN PATENT DOCUMENTS

EP 0 499 150 8/1992
EP 0 624 015 11/1994

OTHER PUBLICATIONS

U.S. patent Ser. No. 09/175,478, filed Oct. 20, 1998 pending.
U.S. patent Ser. No. 09/147,511, filed Jan. 12, 1999, pending.
U.S. patent Ser. No. 09/147,510, Jan. 12, 1999, allowed.
U.S. patent Ser. No. 09/147,667, Feb. 10, 1999, pending.
U.S. patent Ser. No. 09/530,948, May 15, 2000, pending.
U.S. patent Ser. No. 09/895,324, Jul. 2, 2001, pending.
Koso Murakami, IEEE Region 10 Conference on Computer and Communication Systems, vol. 2 of 2, pp. 658–662, "ATM Switching System Architecture and Implementation of B–ISDN", Sep. 24–27, 1990.
Kai–Yeung Siu, et al., Computer Communication Review, vol 24, No. 5, pp. 81–106, "Intelligent Congestion Control for ABR Service in ATM Networks", Oct. 1, 1994.

* cited by examiner

Primary Examiner—Hassan Kizou
Assistant Examiner—Tim Spafford
(74) Attorney, Agent, or Firm—Oblon, Spivak, McClelland, Maier & Neustadt, P.C.

(57) ABSTRACT

A process for detecting upstream congestion within an ATM switch. The switch includes several junctions linked together by a cross-connector. In each input junction, the number of incoming cells bound for a same specified output port of a junction are counted. Results of the count supplied by the input junctions are transferred to the output port. Results of the counts in the output junction are aggregated and a congestion is declared in the output port if the aggregate number of cells is greater than a specified threshold value.

38 Claims, 2 Drawing Sheets

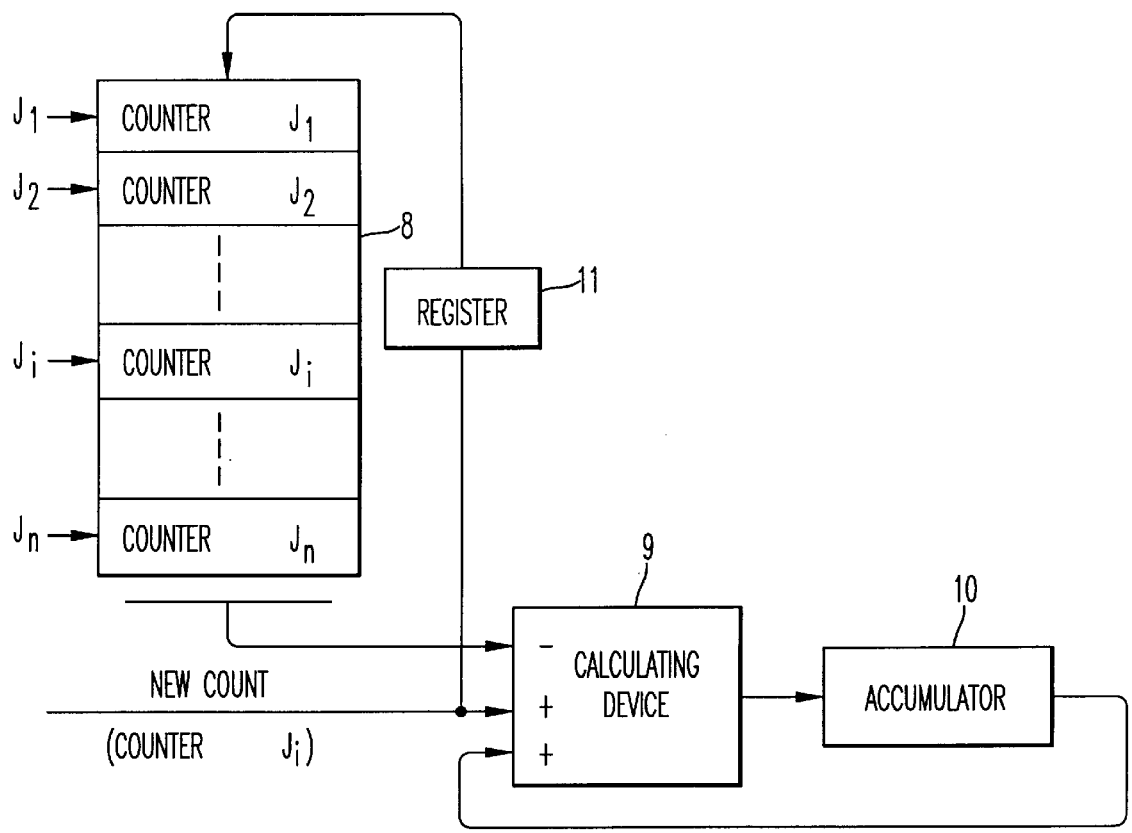
FIG. 4
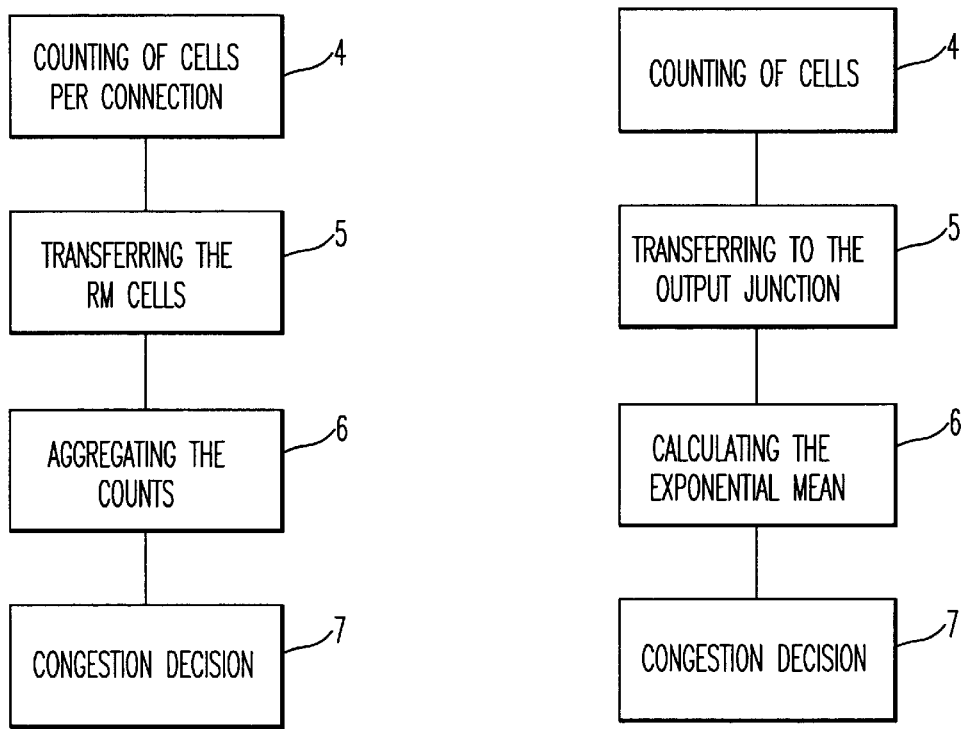
FIG. 5
FIG. 6

METHOD FOR DETECTING UPSTREAM CONGESTION IN AN ATM COMMUTATOR WITH A SWITCHING SYSTEM ARCHITECTURE AND INPUT MEMORIZATION

BACKGROUND OF THE INVENTION

1. Field of the Invention

The present invention relates to a process for detecting upstream congestion within a distributed-architecture switch such as those used in packet-switched data transmission networks, known by the abbreviation ATM standing for "asynchronous transfer mode".

2. Discussion of the Background

It applies in particular to the implementation within ATM networks of the category of service known by the abbreviation ABR standing for "available bit rate". This service allows a user to use the passband available over the path of a previously established connection without obliging him/her to make a static reservation of resources when establishing the connection. In return for this flexibility, the two ends of the connection must adapt their bit rate to the passband available. For this purpose, particular ATM cells, known as RM cells, where RM stands for "resource management", make it possible to inform the ends of a connection about the availability of the resources in the network. These cells, generated and processed in real time by the end equipment and also by the ATM switches, comprise fields intended to convey bit rate information, and in particular the ER bit rate recommended to the source by the network, ER being the abbreviation for "explicit cell rate".

Switches which have this capabiity calculate the ER bit rate and write it to the RM cells. The various known algorithms for calculating the ER bit rate make it possible to share out the resources of a given output port among the various connections which pass through this port. These algorithms generally operate differently depending on whether the switch is in a state of congestion or not, that is to say whether the stream of cells bound for a relevant port is larger than the output bit rate permitted on this port or not.

Congestion is in principle excluded for categories of services which require a static reservation of the resources which they use. Moreover, the ATM cells corresponding to these categories of services are generally switched straightaway, without waiting. This is not the case for services which do not necessitate any reservation of resources, such as ABR, hence buffer memories are generally provided so as to absorb the excess cell rate, by waiting for the sources to reduce their rate in response to the network indications conveyed in the RM cells.

Under these conditions, the momentary congestion of an ouput port of a switch is manifested mechanically as an accumulation of cells bound for this port in the buffer memories. In the case of a distributed-architecture switch composed of several input junctions coupled together by a cross-connector, a momentary congestion of an output port is manifested as an accumulation in the input junctions of the cells bound for this port. This is referred to as upstream congestion. This distributing within the input junctions of the cells bound for a specified output port makes it difficult to aggregate the various partial items of information relating to the cells waiting in each junction, so as to allow bookkeeping operations on them.

SUMMARY OF THE INVENTION

The purpose of the invention is to solve this problem by defining the information to be managed in each input junction and by defining a means for integrating the partial items of information.

To this end, the subject of the invention is a process for detecting upstream congestion within a distributed-architecture ATM switch composed of several input and output junctions for transmission in an ATM cell network, including counting in each input junction the number of incoming cells and outgoing cells bound for a specified output port of a junction, transferring the results of the counts supplied by the input junctions to the output port, aggregating the results of the counts in the output junction, and declaring a congestion in the output port if the aggregate number of cells is greater than a specified threshold value.

BRIEF DESCRIPTION OF THE DRAWINGS

Other characteristics and advantages of the invention will emerge in the description which follows given with regard to the appended drawings which represent:

FIGS. 2 to 6, illustrative implementations of the process according to the invention in the form of flow charts.

DETAILED DESCRIPTION OF THE PREFERRED EMBODIMENTS

Figure 1:
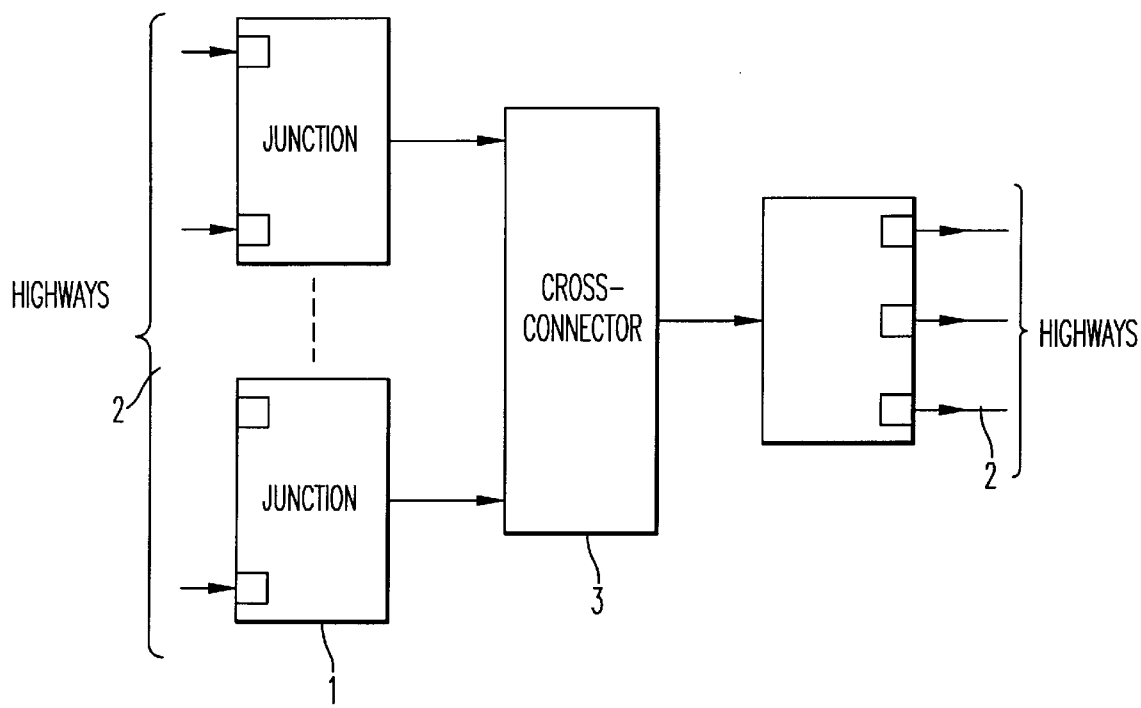
FIG. 1, a simplified representation of an ATM switch used to implement the invention.

The distributed-architecture switch with storage at input which is represented in FIG. 1 is composed of several identical modules or junctions 1 interfacing with one or more high bit rate communication highways 2, of the optical fibre or twisted cable pair type for example, each of these interfaces being referred to hereafter as a port. The junctions are linked together by a very high bit rate switching device or cross-connector 3 structured for example in the manner described in Patent Application FR 2 681 164 filed in the name of the Applicant. Each junction possesses sufficient processing capabilities to analyze the incoming ATM cells, despatch them directly to the ad hoc junction if the latter can process them, or alternatively store them whilst waiting for it to be able to process them. In what follows, the terminology "input junction" and output junction is used to specify that a cell entering a switch encounters firstly an input junction and is then returned to the network by an output junction. This does not imply a classification of the junctions, every junction is an input junction for certain cells and an output junction for others. With this type of architecture, a momentary congestion of an output port is manifested as the accumulation in the input junctions of the cells bound for this port. This congestion is detected at each output port by executing a process which runs according to the steps referenced from 4 to 7 in the flow chart of FIG. 2. According to this process the first step which is referenced 4 in FIG. 2, counts in each input junction the number of cells bound for one and the same output port. Identification of the output port takes place for example in the manner described in Patent Application FR 2 681 164 by reading from the header of each ATM cell showing up at the input of a junction, its cluster number $V_{P1}$ and its channel number $V_{C1}$. Counting takes place by incrementing and decrementing a counter dedicated to the relevant output port each time a cell bound for this output port enters the input junction or leaves it. Another counting variant can also count in each junction each cell per connection. This second variant seems better suited to the cases of point-to-multipoint connections since it can be more difficult in the input junction to update in parallel all the counters per port which are relevant to such a connection.

Figure 2:
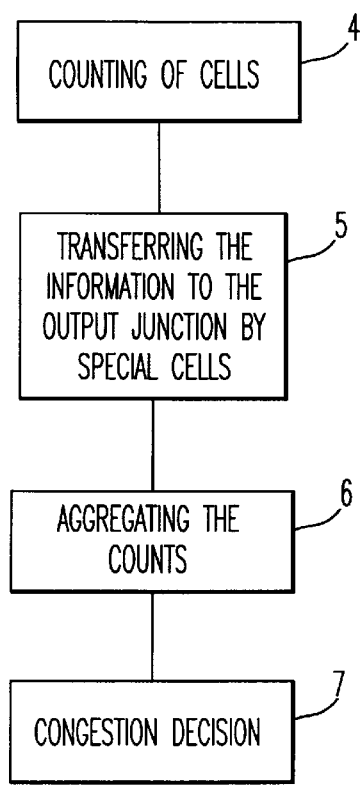

The second step referenced 5 in FIG. 2 centralizes the information collected in the counters of the various junctions in the corresponding output junction 2. The transfer takes place by generating specific ATM cells in each relevant input junction, or by using RM cells, certain fields of which are reserved for the switch. The transfers can be performed in various ways. They can for example be strictly periodic, or take place only when the information varies significantly, or else with a periodicity equal to that of the RM cells when the latter serve as a vehicle for the information.

The purpose of the next step, referenced 6 in FIG. 2, is to aggregate the information transmitted at the previous step in the output junctions 2 so as to compute a measurement of the cell congestion of the input junctions. The result of this measurement can be strictly equal to the number of cells waiting if the synchronization of the information collected is perfect. However, it is sufficient to limit the measurement to a simple sum of the information collected, if the mechanisms for updating the information are sufficiently frequent and effective.

The measurement can also consist of a simple calculation of a mean performed with regard to the information collected by a calculation of an exponential mean for example such as recalled in Appendix 1.

Finally, during the last step referenced 7 in FIG. 2, the measurement obtained in the step referenced 6 is utilized to decide whether or not each relevant output port is subject to a flow of cells whose bit rate is greater than what is permitted to it by its physical characteristics. This can be achieved by marrying a dynamic criterion, such as a significant increase in the congestion measurement for example, with a static criterion such as, for example, the fact that the measurement exceeds a threshold, so as to proclaim that an output port is congested if one of these two criteria is satisfied.

Figure 3:
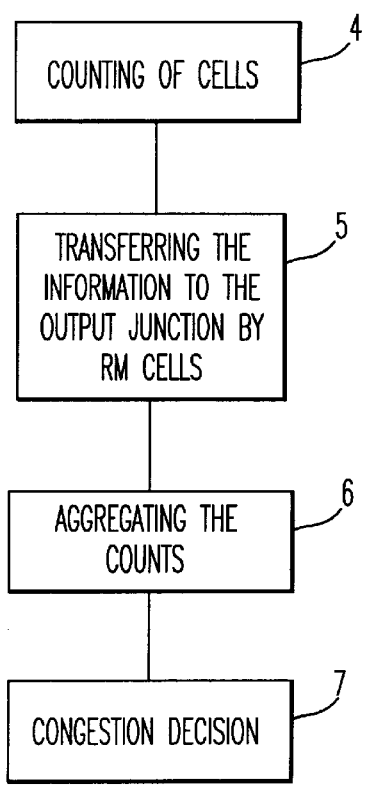

Three variant implementations of the just-described process according to the invention are represented in FIGS. 3 to 5 in which the steps akin to those of FIG. 2 are represented with the same references.

A first variant represented in FIG. 3 uses one counter per output port in each input junction for the execution of the step referenced 4, assuming that each junction 1 comprises just a single output port, and uses RM cells as vehicles in step 5 for the transfer of information to the output junctions. In this transfer, the value of the counter of cells bound for the output port of each RM cell is written by the input junction to this cell together with its own identifier. In the, step referenced 6, the output junction maintains a measurement which is the sum of the information received from each junction, making each junction contribute through the most recent item of information which it has sent to it in the manner represented in FIG. 4, through the updating in the output junction of a table 8 for storing the information items received and which possesses as many inputs as there are input junctions in the switch. Each input denoted $J_1$ to $J_n$ in FIG. 4 addresses a counting zone which stores the state of a corresponding counter in an input junction and which is updated each time that, in the step labelled 5, a transfer of the contents of the counter of the corresponding junction is received in the output junction. Under these conditions, each new contribution of an input junction counter is obtained by subtracting in a calculating device 9, the value of its old count stored in the table 8 from the value of its new count and this contribution is added in the calculating device 9 to the contents of an accumulator register 10 which accumulates with its contents each new contribution received from an input junction. The updating of the table 8 is performed upon the arrival of each new count by way of a register 11. Moreover, a defense mechanism (not represented) warns each junction of the bringing into service and taking out of service of any one of the other junctions, so that these can manage the table 8 and the congestion measurement appropriately. The detection of congestion of the step referenced 7 is performed by marrying a dynamic criterion with a static criterion pertaining to the above-described congestion measurement. A microprogram written in the C language and which makes it possible to execute the steps referenced 6 and 7 is detailed in Appendix 2.

In the second variant represented in FIG. 5, the step referenced 4 implements counters per connection in each input port.

The transfer of the information item contained in a counter bound for an output port takes place in the step referenced 5 by using an RM cell as vehicle. The corresponding input junction writes the value of the counter of cells waiting for the relevant connection to each RM cell. The steps referenced 6 and 7 are similar to those of the first variant with the difference however of the addressing of the counting zones of the table 8 which is performed for each connection. A defense mechanism (not represented) warns each junction of the establishing and of the freeing of the connections passing therethrough, so that the junction can manage the table 8 and the measurement of congestion appropriately. A corresponding microprogram written in the C language is detailed in Appendix 3.

Finally, according to a third variant which is represented in FIG. 6, the process of FIG. 5 can be modified in its third step referenced 6 by performing the measurement of congestion on each output port of an output junction, by calculating the exponential mean of the counting information received for each connection passing through the relevant output port. According to the very principle of the exponential mean detailed in Appendix 1, the influence of a contribution at a given instant on the sum dwindles progressively. In this case, no particular defense mechanism needs to be provided, since a connection which disappears rapidly loses all influence on the measurement owing to the fact that it does not contribute thereto. Also, transporting the counting information in the RM cells has the advantage of giving more weight to the high bit rate connections since these send RM cells more frequently. A corresponding microprogram written in the C language for the execution of this third step is described in Appendix 4.

APPENDIX 1

The "exponential mean" is nothing other than the result of a discrete-time first-order linear filtering. If $u_n$ denotes the string of input values and $x_n$ the string of states of the filter, the state equation of the filter can be written:

$$x_{n+1} = a.x_n + (1-a).u_n \qquad [1]$$

where a is a parameter less than 1, close to 1, which defines the horizon of the filter. The string $x_n$ thus represents a sort of more or less long-term instantaneous mean of the inputs.

In the application envisaged, the input values $u_n$ represent numbers of cells. To avoid floating-point calculations and multiplications, the notable value ⅞ will be used for a and the values $u_n = 4*u_n$ will be averaged so as to retain sufficient accuracy despite the truncation. The measurement of congestion is therefore given by:

$$X_{n+1} = ((X_n << 3) - X_n + U_n) >> 3 \qquad [2]$$

APPENDIX 2

Persistent Variables
    t_word_32 total, old_total
    t_word_16 old_counter [<number of junctors in the switch>]
    t_boolean state_congestion
Initialization Processing
    state_congestion=false
    for (j in old_counter) old_counter[j]=0
    total=old_total=0
FRM Cell Processing
    # retrieval and aggregation of information
    total=total+cell.payload.counter−old_counter[cell.payload.origin]old_counter[cell.payload.origin]=cell.payload.counter # calculation of the congestion state
    state_congestion=(total>old_total)||(total>50) old_total=total

APPENDIX 3

Persistent Variables
    t_word_32 total
    t_word_16 old_counter[<number of connections>]
Initialization Processing
    for (j in old_counter) old_counter[j]=0
    total=0
FRM Cell Processing
    # retrieval and aggregation of information
    total=total+cell.payload.counter−old_counter[cell.vpi_vci]
    old_counter[cell.vpi_vci]=cell.payload.counter

APPENDIX 4

Persistent Variables
    t_word_32 total
Initialization Processing
    total=0
FRM Cell Processing
    # retrieval and aggregation of information total=(total<<3−total+cell.payload.counter<<2)>>3

What is claimed is:

1. Process for detecting upstream congestion within a distributed-architecture ATM switch composed of several input and output junctions for transmission in an ATM cell network, comprising counting in each input junction the number of incoming cells bound for a same specified output port of a junction, transferring the results of the counts supplied by the input junctions to the outport port, aggregating the results of the counts in the output junction, and declaring a congestion in the output port if the aggregate number of cells is greater than a specified threshold value.

2. Process according to claim 1, wherein the transfer of the count results is performed using specific ATM cells.

3. Process according to claim 1, wherein the transfer of the count results is performed using RM cells.

4. Process according to claim 1, comprising, in respect of aggregating the count results, storing the count results in a table of the output junction, subtracting from the new count result supplied by an input junction the previous count result which is stored in the table of the output junction, and accumulating in an accumulator the results of the subtractions obtained.

5. Process according to claim 1, comprising, in respect of determining a congestion on an output port, calculating the exponential mean of the count results received for each connection passing through the output port.

6. Process according to claim 2, comprising, in respect of aggregating the count results, storing the count results in a table of the output junction subtracting from the new count result supplied by an input junction the previous count result which is stored in the table of the output junction and accumulating in an accumulator the results of the subtractions obtained.

7. Process according to claim 3, comprising, in respect of aggregating the count results, storing the count results in a table of the output junction subtracting from the new count result supplied by an input junction the previous count result which is stored in the table of the output junction and accumulating in an accumulator the results of the subtractions obtained.

8. Process according to claim 2, comprising, in respect of determining a congestion on an output port, calculating the exponential mean of the count results received for each connection passing through the output port.

9. Process according to claim 3, comprising, in respect of determining a congestion on an output port, calculating the exponential mean of the count results received for each connection passing through the output port.

10. A process for detecting upstream congestion within a distributed-architecture ATM switch including a plurality of input and output junctions for transmission in an ATM cell network, comprising the steps of:
    counting in each input junction a number of incoming cells bound for a same specified output port of an output junction;
    transferring results of the counting step supplied by the input junctions to the output junctions; and
    declaring a congestion of the specified output port in the output junction by comparing the results of the counting by the input junctions to a specified threshold value.

11. A process according to claim 10, wherein the step of declaring a congestion comprises a step for aggregating results of the counting in the output junction and comparing the aggregating results to said specified threshold value.

12. A process according to claim 10, wherein the step of transferring the results comprises inserting in a cell results of the counting.

13. A process according to claim 12, wherein the step of transferring the results comprises using specific ATM cells.

14. A process according to claim 12, wherein the step of transferring the results comprises using RM cells.

15. A process according to claim 10, wherein the step of declaring a congestion comprises the steps of aggregating results of the counting by storing count results in a table of the output junction, subtracting from a new count result supplied by an input junction a previous count result stored in the table of the output junction, and accumulating in an accumulator results of the subtractions obtained.

16. A process according to claim 11, wherein the step of aggregating results comprises the step of storing count results in a table of the output junction, subtracting from a new count result supplied by an input junction a previous count result stored in the table of the output junction, and accumulating in an accumulator results of the subtractions obtained.

17. A process according to claim 12, wherein the step of declaring a congestion comprises the steps of aggregating results of the counting by storing count results in a table of the output junction, subtracting from a new count result supplied by an input junction a previous count result stored in the table of the output junction, and accumulating in an accumulator results of the subtractions obtained.

18. A process according to claim 13, wherein the step of declaring a congestion comprises the steps of aggregating results of the counting by storing count results in a table of the output junction, subtracting from a new count result supplied by an input junction a previous count result stored in the table of the output junction, and accumulating in an accumulator results of the subtractions obtained.

19. A process according to claim 14, wherein the step of declaring a congestion comprises the steps of aggregating results of the counting by storing count results in a table of the output junction, subtracting from a new count result supplied by an input junction a previous count result stored in the table of the output junction, and accumulating in an accumulator results of the subtractions obtained.

20. A process according to claim 11, wherein the step of declaring a congestion calculates an exponential mean of the count results received for each connection passing through the output port.

21. A process according to claim 12, wherein the step of declaring a congestion calculates an exponential mean of the count results received for each connection passing through the output port.

22. A process according to claim 13, wherein the step of declaring a congestion calculates an exponential mean of the count results received for each connection passing through the output port.

23. A process according to claim 14, wherein the step of declaring a congestion calculates an exponential mean of the count results received for each connection passing through the output port.

24. A device for detecting upstream congestion within a distributed-architecture ATM switch including a plurality of input and output junctions for transmission in an ATM cell network, comprising:

a counter configured to count in each input junction a number of incoming cells bound for a same specified output port of an output junction;

means for transferring the counted number from said counter to said output port; and a device configured to declare a congestion of the specified output port in relation to a specified threshold value.

25. A device according to claim 24, wherein the device configured to declare a congestion comprises a device configured to aggregate results of the counting, and means for comparing the results of the counting to a specified threshold value.

26. A device according to claim 24, wherein said means for transferring comprising means for inserting in a cell the counted number produced by the counter and means to extract the counted number from the cell.

27. A device according to claim 26, wherein the cell is a specific ATM cell.

28. A device according to claim 26, wherein the cell is a RM cell.

29. A device according to claim 24, wherein the device configured to declare a congestion comprises a device configured to aggregate results of the counting and a table configured to store the counted number, a device configured to subtract from a new count result supplied by an input junction a previous count result stored in the table of the output junction, and an accumulator configured to accumulate results of the subtractions obtained.

30. A device according to claim 25, wherein the device configured to declare a congestion comprises a table configured to store the counted number, a device configured to subtract from a new count result supplied by an input junction a previous count result stored in the table of the output junction, and an accumulator configured to accumulate results of the subtractions obtained.

31. A device according to claim 26, wherein the device configured to declare a congestion comprises a table configured to store the counted number, a device configured to subtract from a new count result supplied by an input junction a previous count result stored in the table of the output junction, and an accumulator configured to accumulate results of the subtractions obtained.

32. A device according to claim 27, wherein the device configured to declare a congestion comprises a table configured to store the counted number, a device configured to subtract from a new count result supplied by an input junction a previous count result stored in the table of the output junction, and an accumulator configured to accumulate results of the subtractions obtained.

33. A device according to claim 28, wherein the device configured to declare a congestion comprises a table configured to store the counted number, a device configured to subtract from a new count result supplied by an input junction a previous count result stored in the table of the output junction, and an accumulator configured to accumulate results of the subtractions obtained.

34. A device according to claim 24, wherein the device configured to declare a congestion is configured to calculate an exponential mean of the counted number received for each connection passing through the output port.

35. A device according to claim 25, wherein the device configured to declare a congestion is configured to calculate an exponential mean of the counted number received for each connection passing through the output port.

36. A device according to claim 26, wherein the device configured to declare a congestion is configured to calculate an exponential mean of the counted number received for each connection passing through the output port.

37. A device according to claim 27, wherein the device configured to declare a congestion is configured to calculate an exponential mean of the counted number received for each connection passing through the output port.

38. A device according to claim 28, wherein the device configured to declare a congestion is configured to calculate an exponential mean of the counted number received for each connection passing through the output port.

* * * * *